Patented May 11, 1954

2,678,277

UNITED STATES PATENT OFFICE 2,678,277

METHOD OF PRESERVING FRUIT

Elmer F. Glabe, Chicago, Ill., assignor to Food Technology, Inc., Chicago, Ill., a corporation of Illinois No Drawing. Application May 18, 1950,
Serial No. 162,815

3 Claims. (Cl. 99—154)

This invention relates to an edible fruit food product having outstanding keeping qualities, and more particularly to a fruit product which is preserved against enzyme action. The invention relates also to a process for treating fruit to inactivate the enzymes and to enhance the keeping qualities thereof.

It is well known that most fruits have poor keeping qualities after the skin has been removed so that air can reach the peeled fruit. Within a short period of time peeled fruits tend to become sour and darkened.

One method employed in an attempt to overcome this characteristic in apples involves blanching the apples by heat in order to inactivate and destroy the enzymes. Heat blanched apples are known to have poor taste, texture and color as compared to the fresh product.

Another method involves the use of sodium bisulfite in solution into which the apples are placed and allowed to stand. The sodium bisulfite treatment inhibits the action of enzymes but when used in concentrations large enough to inactivate the enzymes, imparts a characteristic strong flavor to the apple which renders it undesirable for many uses. In addition, treatment by sodium bisulfite is known to cause leaching of the natural sugars from apples. Similar results are obtained when other fruits are subjected to the processes described.

It is an object of the present invention to provide segmented fruits which may be stored without darkening due to oxidation caused by the enzymes.

A further object of the invention is to produce fruits which will retain the texture, taste and color of the freshly peeled fruit during processing and storage.

A further object of the invention is to provide a simple and inexpensive method for treating peeled fruit segments in order to inactivate the enzymes and to preserve the original taste, texture and color of the freshly peeled fruit segment.

Still another object is to produce fruit segments which will not become soft or mushy when allowed to thaw following freezing, or even when cooked after being frozen.

According to the present invention an edible fruit product is provided which may be stored at room temperature for a period of several days or at a refrigerated temperature for a long period of time without substantial change due to the oxidation caused by the enzymes in the fruit. The enzymes are inactivated without affecting the flavor and texture of the fresh fruit segment by introducing a predetermined concentration of sulfur dioxide uniformly through the body of the fruit segment.

The novel and unusual results of the present invention depend upon incorporating from 40 to 90 p. p. m. (parts per million) of sulfur dioxide uniformly into the body of a piece of fruit. The oxidase enzymes will thereby be inactivated so that the fruit will not sour or darken upon storage. The fruit will remain firm or, if it has already become soft, the sulfur dioxide treatment followed by exposure to air will result in a firming of the soft textured fruit.

The concentration of sulfur dioxide recited above may be attained by immersing the fruit in a bath of water or fruit juice to which has been added from 200 to 1800 p. p. m. of sulfur dioxide. It will be understood that immersion time will vary depending upon the concentration of sulfur dioxide in the bath and the concentration of sulfur dioxide desired in the treated fruit. For instance, in a strong bath, an immersion time of only a fraction of a minute will result in complete inactivation of the oxidase enzymes in the fruit.

While it is not intended to limit the invention in any way, the process may best be described by reciting the details of specific examples of the process.

Example I

Whole apples are peeled, cored and divided into segments. Water at approximately room temperature (e. g., 60 degrees F. to 75 degrees F.) is agitated while sulfur dioxide gas is bubbled into the water until the concentration of sulfur dioxide reaches the range of 200 to 800 parts per million based on the weight of the water. At this point sugar or syrup may be added if desired.

Eight and a half pounds of the sulfur dioxide gasified water is placed in a container and about 19½ pounds of apple segments are added to the container. About four pounds of sugar may be added if none has been added to the juice. A cover is tightly affixed to the container and the contents thoroughly mixed, as by rolling or shaking. The enzymes in the apple segments will be thoroughly inactivated within about five minutes after the mixing has begun. Thereafter the deactivated segments may be kept for about two weeks at room temperature or for an indefinite period at refrigerated temperatures.

It will be understood that the process outlined above is equally applicable to the preservation of peaches, cherries, pears, apricots and other soft textured fruits. The concentrations hereinafter described are equally applicable to any of the fruits recited above.

*Example II*

According to this example, whole apples are peeled, cored and divided into segments. A juice is prepared by pressing some of the apples or by mashing and pressing the peels and cores. This juice is boiled down to about 85% to 90% of its original volume. The juice is allowed to cool to approximately room temperature, after which sulfur dioxide gas is bubbled into the cooled juice until a concentration of between 200 and 800 parts per million of sulfur dioxide on the weight of the juice is attained. It is preferable to employ a mechanical agitation of the juice during the gasification step in order to secure more uniform distribution of the gas through the liquid. It has been found that a range of 600 to 700 parts per million of sulfur dioxide on the weight of the juice gives very satisfactory results. Sugar or syrup may be added if it is desired to increase the sweetness of the product.

After the juice is prepared, apple segments are introduced and canned in the manner outlined in Example I.

*Example III*

Some types of apples, peaches, cherries, pears and apricots are known to be soft textured in the natural state. These and most other fruits which have been held in cold storage tend to become mushy and dark upon being withdrawn from cold storage and peeled. One feature of the process is a treatment whereby such soft-textured fruits may be firmed or toughened and darkening prevented.

Soft textured fruit, that is, fruit that is naturally soft textured, or fruit that has been in cold storage is peeled, cored or pited and subjected to my sulfur dioxide treatment. For example, cold storage apples are peeled and cored, or only cored. The apple is immersed in a sulfur dioxide bath for a period of time long enough to build up a concentration of sulfur dioxide between about 40 and about 90 parts per million based on the weight of the apple. When the desired concentration of sulfur dioxide has been attained, the apple is removed from the bath and exposed to air for a period of time sufficient to firm or toughen the texture of the apple a suitable amount. When the desired texture has been attained, the apple is isolated from circulating air as by covering with a cloth or by enclosing in a box or can.

Apples treated by the above described process do not darken or become mushy. They may be kept for about two weeks at room temperature and for an indefinite period in cold storage. The process is especially adapted to the preparation of apples used as baked apples. The apples may be treated as above described, either fresh or from cold storage, and then delivered to restaurants, caterers and hotels where they can be kept at room temperature for as much as two weeks without darkening or mushing. Such a method of handling apples is unusual and has heretofore been unknown in the art.

It is contemplated that the bath be prepared to have a sulfur dioxide concentration of 200 to 1800 parts per million based on the weight of the liquid. In the weaker baths the immersion time required to build up a concentration of 40 to 90 p. m. m. of sulfur dioxide on the weight of the apple will be relatively long. In the stronger baths, the immersion time will, of course, be relatively short. For example, immersion in a bath containing 1600 p. p. m. of sulfur dioxide (at room temperature) for a period of 5 to 90 seconds will usually give the required sulfur dioxide concentration in the apple. In a bath containing 1200 p. p. m. immersion for about three minutes will be sufficient.

Exposure to circulating air as described above toughens or firms the apple without darkening it. The degree of firmness attained will depend upon the length of time the apple is exposed to circulating air—firmness increasing with time. Exposure from five minutes to three hours has given good results. It will be understood that the degree of firmness desired will vary with the type of apple being processed and with the use for which it is intended.

The determination of the concentration of sulfur dioxide in the apple is a simple, routine chemical analysis, the details of which need not be recited. The determination of the degree of firmness is a simple physical test which may be made by feeling the apple.

Peaches, cherries, pears, apricots and other soft textured fruits may be processed by the method outlined above for apples. It is unusual that such fruits can be processed, either fresh or out of cold storage, so that they will not become mushy or discolored upon storage at room temperature for a relatively long time.

*Example IV*

In addition to preventing mushing of the fruits, the invention also contemplates a treatment whereby the texture of tender fruits can be improved. For example, most apples which have been cold stored (38–40° F.) for five or six months after picking time, even firm textured apples of the York Imperial or Rome Beauty variety, normally exhibit a very poor texture when processed according to the usual processes of heat blanching followed by canning or freezing. But by employing my process and by using concentrations of sulfur dioxide in the solution between 200 and 1800 parts per million, it is possible to cause a toughening of the texture of the stored apple, thereby improving the quality of the fruit.

It has also become possible to toughen the texture of apples which are generally recognized as tender or mushy textured. For example, the texture of a tender apple, such as the Delicious, Golden Grimes or Jonathan variety, can be toughened by contacting the apple with a solution containing sulfur dioxide in concentrations of about 1000 to 1200 parts per million. Hence, my process makes possible the general use of types of apples which have heretofore not been usable for many purposes because of their tender or mushy texture.

In the above embodiments of the invention, the enzymes in the apple are thoroughly inactivated by the dispersion of about 40 to 90 p. p. m. of sulfur dioxide throughout the apple.

Sulfur dioxide is introduced into the processing liquors by any suitable method, such as by bubbling it into water or fruit juice as described in the examples. Another convenient method is by introducing liquefied sulfur dioxide into an agitated body of water or juice until the desired concentration of between 200 and 1000 parts per million of sulfur dioxide is reached.

It is unusual that such low concentrations of sulfur dioxide will give the results described above for the present invention. In the sodium bisulfite process hitherto employed, an amount of sodium bisulfite sufficient to give the equivalent of between 2000 and 2500 parts per million of sulfur dioxide has been employed in the treating liquor. This concentration was required in order to cause satisfactory penetration of the fruit It was also necessary that the treated fruit have a minimum concentration of 250 parts per million of sulfur dioxide derived from sodium bisulfite based on the weight of the fruit. At concentrations below this figure inactivation of the enzymes was not satisfactory. On the other hand, even at the minimum concentration of 250 parts per million a strong and unpleasant flavor was imparted to the treated fruit.

It will be apparent that fruits prepared according to the present invention have properties which have heretofore been unobtainable by known methods. The ease of packing and handling the product of the invention is an important feature because it is now possible to store and ship fruits without refrigeration and without any substantial change in color, texture or taste due to oxidation by the enzymes. Fruit prepared according to this invention remains plump, well shaped, sweet and non-drying during the storage period, either for several days at room temperature or indefinitely at refrigerated temperatures.

Another important feature of the invention is the fact that fruits treated by this process are not subject to the mushing tendency during cooking which is characteristic of fruits treated by heat blanching processes. By this process tender textured fruits which would have been subject to mushing when treated by ordinary heat blanching processes will retain their texture without mushing. Fruits which have been processed as herein described solely by a sulfur dioxide treatment and then frozen have a great advantage over heat blanched canned and frozen fruits in that they have a much less tendency to mush when cooked and are far superior in taste to bisulfite treated frozen fruits. My process makes possible the storage and use of types of apples, cherries, pears, apricots and peaches which heretofore have been usable only when strictly fresh. Since these fruits are highly desirable for many uses, it will be seen that the present invention has important advantages economically in making possible the preservation and storage of such fruits substantially in their fresh condition.

From the foregoing disclosure it will be seen that the present invention provides an edible fruit food product which has outstanding keeping characteristics either at room temperature or at refrigerated temperatures. The oxidase enzymes of the fruit product are thoroughly inactivated by the use of low concentrations of sulfur dioxide which is caused to uniformly penetrate the product. The simplicity of the process of the present invention is an important feature since it results in low cost treatment using simple apparatus and inexpensive chemicals. The treated product is easily packed, shipped and stored with substantial savings since the product need not be refrigerated for a considerable period of time. The finished product is fruit which retains all of the desirable taste, texture and color characteristics of a freshly peeled product.

The invention is hereby claimed as follows:

1. The method of preserving fruit substantially in fresh condition which consists essentially in the steps of immersing soft textured freshly peeled fruit substantially in fresh condition in an aqueous liquor containing 1000 to 1800 parts per million of sulfur dioxide for a period of time sufficient to impregnate the fruit uniformly throughout the body thereof with 40 to 90 parts per million of sulfur dioxide based on the weight of fruit removing said fruit from said liquor, exposing said impregnated fruit to air for a period of time for 5 minutes to 3 hours sufficient to bring about a firming of the texture of said fruit but under conditions insufficient to otherwise affect the physical characteristics of said fruit, and isolating the resultant fruit from circulating air.

2. The method of preserving fruit substantially in fresh condition which consists essentially in the steps of immersing soft textured freshly peeled fruit substantially in fresh condition in an aqueous liquor containing about 1200 to about 1600 parts per million of sulfur dioxide for 5 to 180 seconds in order to impregnate the fruit uniformly throughout the body thereof with 40 to 90 parts per million of sulfur dioxide based on the weight of fruit, removing said fruit from said liquor, exposing said impregnated fruit to a current of air for five minutes to three hours sufficient to bring about a firming of the texture of said fruit but under conditions insufficient to otherwise affect the physical characteristics of said fruit, and isolating the resultant fruit from circulating air.

3. The method of preserving apples substantially in fresh condition which consists in immersing cored, freshly peeled and segmented apples from the class consisting of fresh apples and apples which have been stored under refrigeration conditions in an aqueous liquor containing 1000 to 1800 parts per million of sulfur dioxide for 5 to 180 seconds in order to impregnate the apples uniformly throughout the body thereof with 40 to 90 parts per million of sulfur dioxide based on the weight of the apples, removing said apples from said liquor, exposing the impregnated apples to air for 5 minutes to 3 hours sufficient to bring about a firming of the texture of the apples but under conditions insufficient to otherwise affect the physical characteristics of said apples, and packaging the resultant apples.

References Cited in the file of this patent

UNITED STATES PATENTS

| Number | Name | Date |
| --- | --- | --- |
| 176,754 | Mefford et al. | May 2, 1876 |
| 2,028,970 | Ewell | Jan 28, 1936 |
| 2,166,072 | Pope et al. | July 11, 1939 |
| 2,178,675 | Thomas | Nov. 7, 1939 |
| 2,186,549 | Luban | Jan. 9, 1940 |
| 2,298,933 | Elion | Oct. 13, 1942 |
| 2,451,313 | Arengo-Jones | Oct. 12, 1948 |
| 2,506,793 | Kalmar et al. | May 9, 1950 |
| 2,509,299 | Grom | May 30, 1950 |
| 2,541,859 | Callaghan et al. | Feb. 13, 1951 |

OTHER REFERENCES

"Disinfection and Sterilization" 1945 by E. C. McCullock, published by Lea and Febiger, Phila., page 246, article entitled "Sulfurous Acid."